United States Patent Office

3,594,118
Patented July 20, 1971

3,594,118
SEPARATION OF YTTRIUM AND CERIUM
Phyllis R. Dodds, Wysox, Pa., assignor to
Sylvania Electric Products Inc.
No Drawing. Filed Oct. 30, 1968, Ser. No. 772,031
Int. Cl. C22b 59/00; C01f 17/00
U.S. Cl. 23—23                                 3 Claims

ABSTRACT OF THE DISCLOSURE

A process for recovering a purified material containing yttrium values from an impure material containing yttrium and cerium is disclosed. The process comprises dissolving the impure material in an aqueous solution of a mineral acid having a critical concentration of acid, contacting the resulting solution with an organic solution containing a critical concentraton of di-2-ethylhexyl phosphoric acid for sufficient time to extract yttrium into the organic solution, separating the organic and the aqueous solutions, contacting the organic solution with an aqueous nitric acid solution having a concentration of nitric acid of at least 3.5 moles/liter for a time sufficient to remove the yttrium into the aqueous solution and recovering the purified yttrium values that contain less than 50 p.p.m. of cerium.

BACKGROUND OF THE INVENTION

This invention relates to the purification of materials useful in the production of cathodoluminescent phosphors. More particularly it relates to the removal of cerium impurities from the raw materials used to produce the cathodoluminescent phosphors.

The new red-emitting rare earth phosphors have greatly contributed to the color television industry because of the brightness of the red color emission. These red-emitting phosphors such as the yttrium vanadate-europium activated phosphors, the yttrium oxide-europium activated phosphors, and the yttrium oxysulfide-europium activated phosphors, are extremely bright red-emitting phosphors, however, their brightness is considerably diminished by the presence of cerium. It is to be noted that although yttrium is not a rare earth of the lanthanide series, yttrium behaves very similarly to the rare earth metals of the lanthanide series in most instances.

Raw materials for the production of these new rare earth phosphorus generally contain at least some cerium. If the cerium content of the phosphors is greater than about 50 p.p.m., the brightness of the phosphor is reduced. It is generally necessary to further purify the yttrium values to remove essentially all of the cerium.

It is knows to separate cerium from yttrium oxide by chemical precipitation with ammonium carbonate and ammonium persulfate. Although some purification results, the process is difficult to operate and has relatively low yields due to the production of sludge that contains relatively high amounts of yttrium. Other conventional separation techniques, such as fractional crystallization, ion-exchange and other extraction methods are generally unsuitable because of one or more of the deficiencies comprising low yields, low throughput and insufficient purification.

It is believed, therefore, an efficient process that can produce purified yttrium containing less than 50 p.p.m. cerium and is capable of a large throughput, is an advancement in the art.

SUMMARY OF THE INVENTION

In accordance with one aspect of this invention there is provided a process for recovering a purified material containing yttrium and having a cerium content of less than 50 p.p.m. from an impure material containing higher amounts of cerium. The process comprises dissolving the impure material in an aqueous solution of mineral acid having a concentration of from about 0.4 moles/liter to about 0.8 moles/liter contacting the resulting aqueous solution with a water-immiscible organic solution having a concentration of di-2-ethylhexyl phosphoric acid of about 0.75 moles/liter for a sufficient time to extract said rarer earth values into the organic solution, separating the aqueous and organic solution, contacting said organic solution with an aqueous solution containing a concentration of nitric acid of at least about 3.5 moles/liter for a time to extract said yttrium values into said aqueous acidic solution and thereafter recovering the purified yttrium that contains less than 50 p.p.m. of cerium based upon the weight of the yttrium.

DESCRIPTION OF THE PREFERRED EMBODIMENTS

The concentration of the mineral acid in the aqueous solution used to dissolve the impure material has been found to be essential in order to achieve satisfactory separation of yttrium and cerium. Lower concentration than about 0.4 moles/liter enables high recovery of yttrium, however, the cerium content is relatively high, thus requiring additional purification. Use of concentrations of acids higher than about 0.8 mole/liter results in good purification, however, the yields based upon yttrium recovery are lowered. It is preferred, therefore, that a mineral acid having a concentation of from about 0.5 mole/liter to about 0.75 mole/liter be used. Although any mineral acid, such as hydrochloric, sulfuric, nitric and the like can be used, it is preferred to use hydrochloric acid.

The amount of impure material dissolved in above-described mineral acid will depend upon the acid used and the purity of the particular impure material. The concentration of the yttrium in the acidic solution is not critical as long as the material is dissolved.

After the acidic aqueous solution is prepared it is contacted with an organic solution having a critical concentration of di-2-ethylhexyl phosphoric acid. It is to be noted that other similar extracts, such as n-butyl phosphate, do not achieve the desired separation. The concentration of the di-2-ethylhexyl phosphoric acid is about 0.75 mole/liter. Use of higher concentrations of the extractant results in cerium being extracted along with the yttrium. Use of lower concentrations of di-2-ethylhexyl phosphoric acid results inadequate extraction of the yttrium from the aqueous solution.

Various quantities of the solvent extractant solution can be used, however, to achieve optimum recovery of yttrium and optimum costs it is preferred to use about equal volumetric quantities of the solvent-extractant solution and the acidic aqueous solution.

Any water-immiscible organic solvent that will dissolve at least 1 gram of di-2-ethylhexyl phosphoric acid in 100 ml. of solvent at 25° C. can be used. The aromatic solvents, such as benzene, toluene, xylene and the like, are normally used although other organic hydrocarbon water-immiscible solvents can be used if desired.

The time required for contacting the organic extractant solution and the aqueous solution containing the impure material will be dependent upon various factors such as the amount of cerium present, the concentrations of materials, the volumes of the materials used and the like. Contact time can be selected by one skilled in the art from the disclosure herein and knowledge of the particular material to be purified. In a similar manner the time of contact between the organic solution and the aqueous nitric acid solution can be supplied by one skilled in the art.

It is to noted that the present invention is apparently selective in the purification of yttrium and does not separate cerium from other rare earths. For example, when an impure gadolinium source containing cerium is subjected to a substantially identical process, practically no separation of gadolinium and cerium occurs. It is believed that this characteristic is surprising since yttrium normally behaves similar to the rare earths of the lanthanide series and quite similar to gadolinium in many aspects.

Although various methods can be used to recover the yttrium values, one of the preferred methods is to add oxalic acid thus converting the yttrium to the water insoluble yttrium oxalate. After separation by conventional techniques such as filtration, centrifugation decantations and the like, the yttrium oxalate can be converted to phosphor-grade yttrium oxide by conventional heating techniques.

For a better understanding of the present invention, together with other and further objects, advantages and capabilities thereof, reference is made to the following examples and appended claims in connection with the above description of some of the aspects of the invention. All parts, proportions and percentages are by weight unless otherwise indicated.

EXAMPLE I

Three samples of yttrium oxide containing 100, 200 and 500 p.p.m. of cerium are dissolved in a hydrochloric acid solution having a concentration of 0.75 moles/liter. Each sample contains about 2.3 parts of yttrium oxide per 100 parts of the hydrochloric acid solution. The samples are contacted with equal volumes of a di-2-ethylhexyl phosphoric acid solution dissolved in toluene having a concentration of about 0.75 moles/liter. After 45 minutes of contact the solutions are allowed to settle and the aqueous and organic phases are separated. The organic phase is contacted from about 20 minutes with an equal volume of an aqueous nitric acid solution having a concentration of about 5 moles/liter. After settling, a sample of the aqueous phase of each sample shows greater than 90% of the yttrium is present in the aqueous phase and no trace of cerium. The aqueous solution containing yttrium nitrate is suitable for conversion to yttrium oxalate which is oxidized to phosphor-grade yttrium oxide.

EXAMPLE II

A sample of about 23 parts of yttrium oxide containing greater than 50 p.p.m. of cerium is dissolved in about 1000 parts of a hydrochloric acid solution having a concentration of about 0.5 moles/liter and is then treated with the extractant as in Example I. Analysis of samples of the aqueous and organic phases after separation indicates about 93.3% of the yttrium is recovered and a cerium content of less than about 50 p.p.m. based upon the amount of yttrium present. The separation factor, calculated from the ratio of the distribution coefficient of yttrium divided by the distribution coefficient of cerium is about 1220. Increasing the concentration of the HCl to about 0.75 moles/liter does not materially effect the separation factor, however, a decrease in the di-2-ethylhexyl phosphoric acid concentration to about 0.5 moles/liter M while the HCl concentration is at 0.75 moles/liter results in a decrease of the separation factor to about 92. An increase in the concentration of di-2-ethylhexyl phosphoric acid concentration with the HCl concentration at 0.5 moles/liter results in excessive (about 10%) amounts of cerium being extracted into the organic phase.

Under substantially similar conditions, only having galodinium substituted for the yttrium in substantially stoichmetric amounts, a separation factor of about 11 is achieved based upon the distribution coefficients of gadolinium and cerium.

What is claimed is:

1. A process for recovering substantially purified yttrium containing less than 50 p.p.m. of cerium based upon the weight of yttrium from an impure material containing said yttrium and more than 50 p.p.m. of cerium based upon the weight of yttrium, said process comprising:
   (a) dissolving said impure material in an aqueous solution of a mineral acid having an acid concentration of from about 0.4 moles/liter to about 0.8 moles/liter;
   (b) contacting the resulting aqueous acidic solution with an organic solution containing about 0.75 moles/liter of di-2-ethyl-hexyl phosphoric acid for a sufficient time to extract said yttrium into said organic solution;
   (c) separating said aqueous solution and said organic solution;
   (d) contacting said organic solution with an aqueous nitric acid solution containing at least 3.5 moles/liter of nitric acid, for a time sufficient to extract said yttrium values into said aqueous solution, and;
   (e) recovering said purified yttrium.

2. A process according to claim 1 wherein said mineral acid is hydrochloric acid.

3. A process according to claim 2 wherein said mineral acid concentration is from about 0.5 moles/liter to about 0.75 moles/liter.

References Cited

UNITED STATES PATENTS

| | | | |
|---|---|---|---|
| 2,955,913 | 10/1960 | Peppard et al. | 23—23 |
| 3,110,556 | 11/1963 | Peppard et al. | 23—23 |
| 3,351,424 | 11/1967 | Bray et al. | 23—22 |

HERBERT T. CARTER, Primary Examiner

U.S. Cl. X.R.

252—301.4; 23—312